United States Patent
Raghavan et al.

(10) Patent No.: US 12,342,296 B2
(45) Date of Patent: Jun. 24, 2025

(54) TECHNIQUES FOR SIGNALING ANTENNA MODULE INFORMATION FOR DEVICES WITH ADAPTABLE FORM FACTOR CONFIGURATIONS

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Junyi Li, Fairless Hills, PA (US); Tao Luo, San Diego, CA (US); Raghu Narayan Challa, San Diego, CA (US); Ruhua He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 17/901,350

(22) Filed: Sep. 1, 2022

(65) Prior Publication Data

US 2024/0080781 A1 Mar. 7, 2024

(51) Int. Cl.
*H04W 52/42* (2009.01)
*H04W 52/06* (2009.01)
*H04W 52/36* (2009.01)

(52) U.S. Cl.
CPC ........... *H04W 52/42* (2013.01); *H04W 52/06* (2013.01); *H04W 52/367* (2013.01)

(58) Field of Classification Search
CPC ...... H04W 52/42; H04W 52/06; H04W 52/36
See application file for complete search history.

(56) References Cited

U.S. PATENT DOCUMENTS

| | | | | |
|---|---|---|---|---|
| 6,711,388 B1* | 3/2004 | Neitiniemi | ........... | H03G 3/3042 455/571 |
| 8,245,930 B2* | 8/2012 | Bellows | ............... | G06K 7/1098 235/462.43 |
| 9,020,554 B2* | 4/2015 | Tee | ........................ | H04W 52/58 370/318 |
| 9,173,173 B2* | 10/2015 | Wei | ..................... | H04W 52/243 |
| 10,270,296 B2* | 4/2019 | Cheikh | ................... | H02J 50/60 |
| 11,019,666 B2* | 5/2021 | Zhang | ................. | H04W 74/006 |
| 11,070,279 B2* | 7/2021 | Raghavan | ............ | H04B 7/0417 |

(Continued)

FOREIGN PATENT DOCUMENTS

WO 2021154710 A1 8/2021

OTHER PUBLICATIONS

International Search Report and Written Opinion—PCT/US2023/073012—ISA/EPO—Dec. 13, 2023.

*Primary Examiner* — Hai V Nguyen
(74) *Attorney, Agent, or Firm* — QUALCOMM Incorporated

(57) ABSTRACT

Certain aspects of the present disclosure provide techniques for communicating antenna module information, beamforming capabilities, power control information, etc., for computing devices capable of operating in multiple form factor configurations. A example technique includes detecting that the UE is operating in a first form factor configuration of a plurality of form factor configurations the UE is adapted to operate in. The technique also includes, in response to the detection, transmitting information associated with at least one antenna module of the UE in the first form factor configuration.

30 Claims, 12 Drawing Sheets

(56) References Cited

U.S. PATENT DOCUMENTS

| | | | | |
|---|---|---|---|---|
| 11,528,068 B2* | 12/2022 | Xu | ................. | H04B 7/0417 |
| 12,003,266 B2* | 6/2024 | Zhou | ................. | H04W 52/365 |
| 2004/0183780 A1* | 9/2004 | Albulet | ................. | G06F 3/038 |
| | | | | 345/163 |
| 2009/0061939 A1* | 3/2009 | Andersson | ............. | H04B 7/082 |
| | | | | 455/562.1 |
| 2009/0196372 A1* | 8/2009 | Zhang | ................. | H04B 7/0817 |
| | | | | 375/267 |
| 2011/0121075 A1* | 5/2011 | Bellows | ................. | G06K 7/109 |
| | | | | 235/440 |
| 2014/0038659 A1* | 2/2014 | Wei | ................. | H04W 52/243 |
| | | | | 455/522 |
| 2014/0302885 A1* | 10/2014 | Pinheiro | ............. | H04W 52/34 |
| | | | | 455/67.11 |
| 2017/0127358 A1* | 5/2017 | Jain | ................. | H04W 52/365 |
| 2017/0201950 A1* | 7/2017 | Liu | ................. | H04W 52/146 |
| 2017/0303204 A1* | 10/2017 | Hu | ................. | H04W 52/367 |
| 2017/0324431 A1* | 11/2017 | Solan | ................. | H04W 52/52 |
| 2018/0310257 A1* | 10/2018 | Papasakellariou | .. | H04W 52/325 |
| 2018/0317180 A1* | 11/2018 | Li | ................. | H04W 52/242 |
| 2018/0323658 A1* | 11/2018 | Cheikh | ................. | H02J 50/20 |
| 2019/0215775 A1* | 7/2019 | Almquist | ............. | H04W 52/08 |
| 2019/0306806 A1* | 10/2019 | Sood | ................. | H04W 52/243 |
| 2020/0053724 A1* | 2/2020 | MolavianJazi | ..... | H04W 52/281 |
| 2020/0195336 A1* | 6/2020 | Raghavan | ............. | H04B 7/0874 |
| 2020/0229104 A1* | 7/2020 | MolavianJazi | ....... | H04W 52/42 |
| 2020/0374073 A1* | 11/2020 | Chen | ................. | H04L 5/0048 |
| 2021/0297131 A1* | 9/2021 | Xu | ................. | H04B 7/0617 |
| 2022/0109472 A1 | 4/2022 | Na et al. | | |
| 2022/0210744 A1* | 6/2022 | Ren | ................. | H04W 52/242 |
| 2022/0385381 A1* | 12/2022 | MolavianJazi | ....... | H04W 72/54 |
| 2023/0045623 A1* | 2/2023 | Chen | ................. | H04W 52/54 |
| 2023/0046985 A1* | 2/2023 | Shen | ................. | H04B 17/336 |
| 2023/0239929 A1* | 7/2023 | Lin | ................. | H04W 52/242 |
| | | | | 370/329 |
| 2024/0056115 A1* | 2/2024 | Zhou | ................. | H04W 52/365 |
| 2024/0171207 A1* | 5/2024 | Zhou | ................. | H04W 52/365 |

* cited by examiner

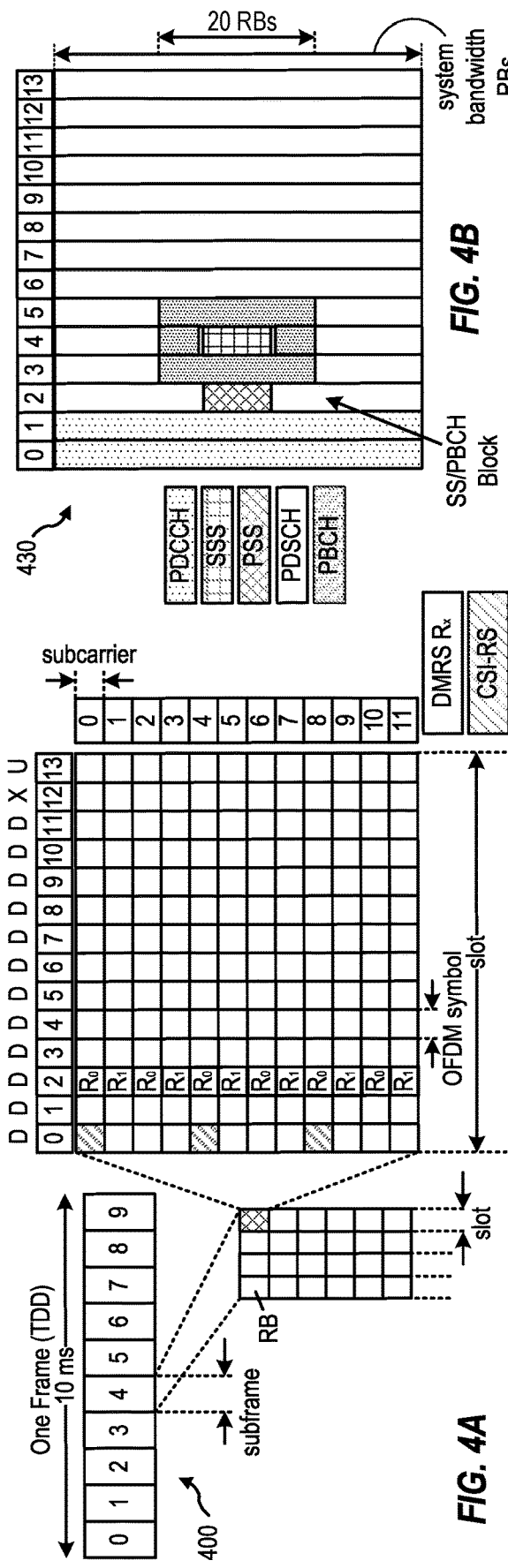
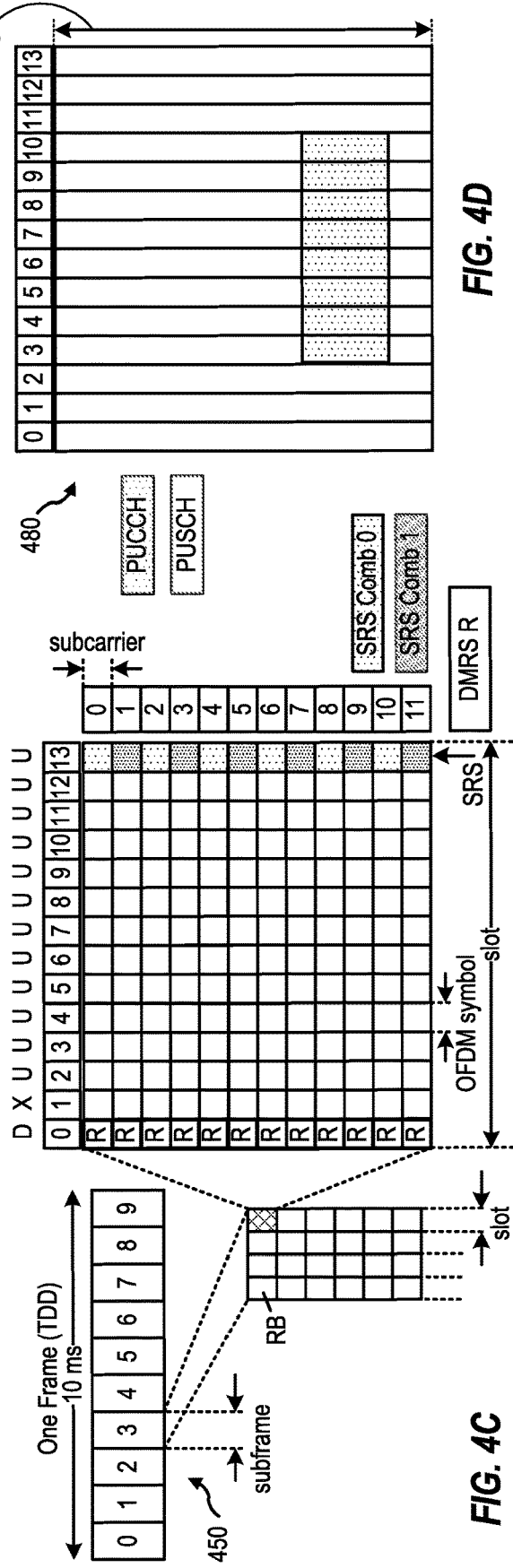

TECHNIQUES FOR SIGNALING ANTENNA MODULE INFORMATION FOR DEVICES WITH ADAPTABLE FORM FACTOR CONFIGURATIONS

BACKGROUND

Field of the Disclosure

Aspects of the present disclosure relate to wireless communications, and more particularly, to techniques for communicating antenna module information, beamforming capabilities, power control information, etc., for computing devices capable of operating in multiple different form factor configurations.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, millimeter wave (mmW) systems may allow for high data rate transmissions in user equipments (UEs) and other types of devices. Traditionally, UEs have been designed with a fixed form factor where the locations of the antenna modules on the UE used for mmW signaling are fixed stationary. Due to the UE's fixed form factor, there may not be any relative displacement between antenna modules on the UE due to the UE's movement or change in position.

Recently, however, many UEs have been designed to have multiple degrees of freedom that allow the UE to operate in multiple different form factors. For example, such UEs may have multiple degrees of freedom that allow the UEs to be folded, flipped, rolled, etc. The operation of such UEs in mmW systems can be impacted by the ability of the UEs to operate in multiple different form factors. Accordingly, there is a desire to improve the technical performance of wireless communications systems that include UEs capable of operating in multiple different form factors.

SUMMARY

One aspect provides a method for wireless communications by a user equipment (UE). The method includes detecting that the UE is operating in a first form factor configuration of a plurality of form factor configurations the UE is adapted to operate in. The method also includes, in response to the detection, transmitting information associated with at least one antenna module of the UE in the first form factor configuration.

Another aspect provides a method for wireless communications by a network node. The method includes receiving information associated with at least one antenna module of a user equipment (UE) operating in a first form factor configuration of a plurality of form factor configurations. The method also includes determining a reference signal configuration, based at least in part on the information. The method further includes transmitting an indication of the reference signal configuration.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

DETAILED DESCRIPTION

Figure 1:
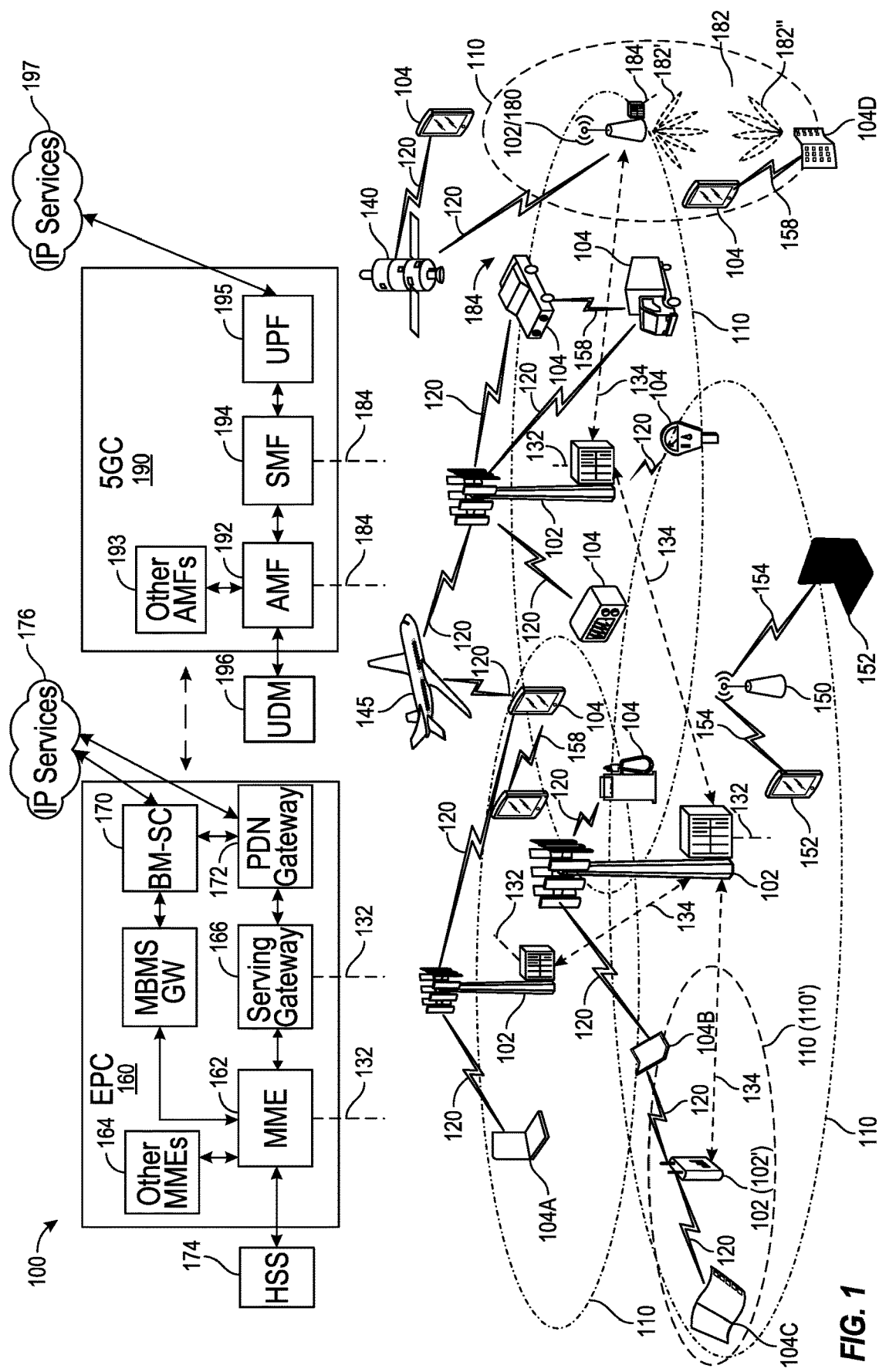
FIG. 1 depicts an example wireless communications network.

Aspects of the present disclosure provide apparatuses, methods, processing systems, and computer-readable mediums for communicating one or more (or a combination of) different types of information associated with antenna module(s) of a user equipment (UE) capable of operating in different form factor configurations.

Recently, UEs (e.g., smartphones, tablets, electronic readers, laptops, displays, watches, gaming devices, etc.) are increasingly designed to have multiple degrees of freedom that allow the UEs to operate in different form factors. For example, a UE may have degrees of freedom that allow the UE to be folded (e.g., a foldable form factor), flipped (e.g., a flippable form factor), rolled (e.g., a rollable form factor), etc. Additionally, depending on the UE's form factor, the UE may be able to operate in different configurations (or operating modes). For example, the UE may be able to operate in one or more open configurations for the UE's particular form factor and a closed configuration for the UE's particular form factor.

However, one technical challenge with UEs that are capable of operating in multiple different form factor configurations is that certain form factor configurations can impact the wireless communication performance of the UE, including, for example, high data rate transmissions of the UE in mmW systems. For example, the technical performance (e.g., speed, data carrying capacity, efficiency, reliability, power consumption, etc.) of wireless communications in mmW systems may be based on the configuration of antenna module(s) of the UE (e.g., antenna module location(s), antenna module orientation(s), power control configuration for the antenna module(s), beamforming configuration for the antenna module(s), etc.). For a UE that has a fixed form factor configuration, the UE may be able to use the same antenna module configuration due to issues such as blockage, since there may not be any change in the relative position of antenna modules of the UE during the UE's operation. On the other hand, for a UE that is capable of operating in multiple form factor configurations, the relative position of antenna modules of the UE may change depending on the particular form factor configuration the UE is operating in. For example, the relative position of antenna modules may change in "open" and "closed" form factor configurations.

Currently, it may not be possible for a UE having the ability to operate in multiple form factor configurations to determine an updated antenna module configuration over time, based on the particular form factor configuration the UE is operating in at a particular point in time. Consequently, during certain points in time of the UE's operation, the UE may have to use (or rely on) a sub-optimal antenna module configuration when performing wireless communications, including, for example, high data rate or low latency transmissions in mmW systems. Using a sub-optimal antenna module configuration can negatively impact the wireless communication performance of the UE, including, for example, reducing one or more of the speed, data carrying capacity, efficiency, reliability, etc., of the wireless communications, increasing power consumption of the UE, and the like. As used herein a sub-optimal antenna module configuration may refer to an antenna module that is optimized or configured for a form factor configuration that is different from the form factor configuration the UE is currently operating in.

To address the aforementioned technical challenges, certain aspects described herein provide techniques for communicating (or signaling) information associated with at least one antenna module of the UE based on a form factor configuration that the UE is operating in at a particular point in time. As described below, the information signaled by the UE can include at least one of: (i) antenna module information (e.g., location/orientation of the antenna module(s)), (ii) beamforming information associated with the antenna module(s), or (iii) power control information associated with the antenna module(s). The UE may signal the information to a network entity (or node) (e.g., a base station (BS), such as a gNB). The UE may receive an indication of an (updated) reference signal configuration from the network entity and may use the (updated) reference signal configuration for performing wireless communications. By enabling a UE to dynamically update information associated with one or more of the UE's antenna modules over time based on the current form factor configuration the UE is operating in, aspects can significantly improve the performance of wireless communications by the UE, including high data rate transmissions in mmW systems.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others. Certain UEs 104 may have different form factors. In FIG. 1, for example, UE 104A has a flippable form factor, UE 104B has a foldable form factor, UE 104C has a rollable form factor, UE 104D has a foldable form factor, etc. Note that the different UE form factors depicted in FIG. 1 are provided as non-limiting examples of various form factors for a UE; it should be understood that a UE 104 can have any form factor, now known or later developed.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
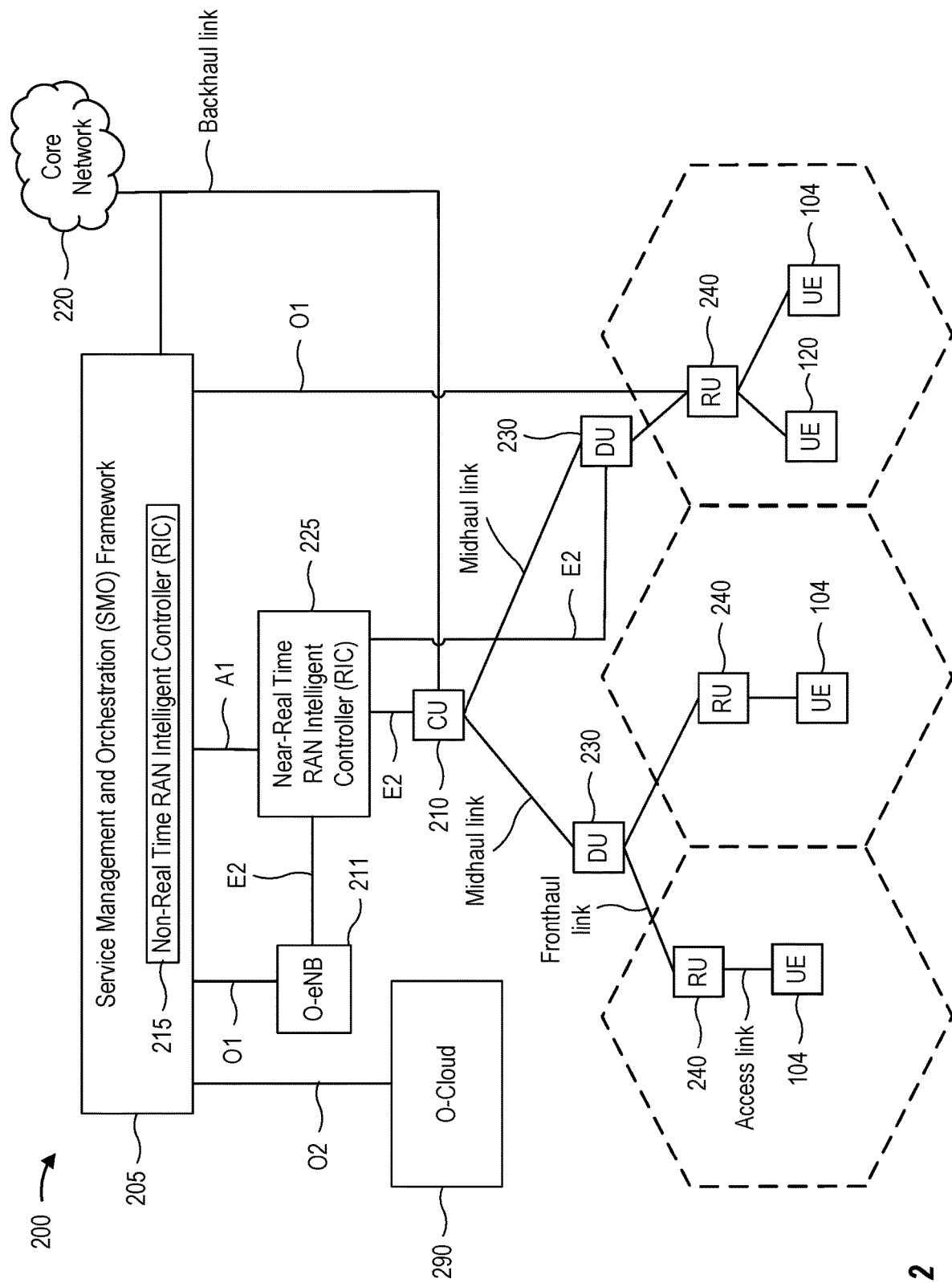
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT MC 225.

In some implementations, to generate AI/ML models to be deployed in the Near-RT MC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
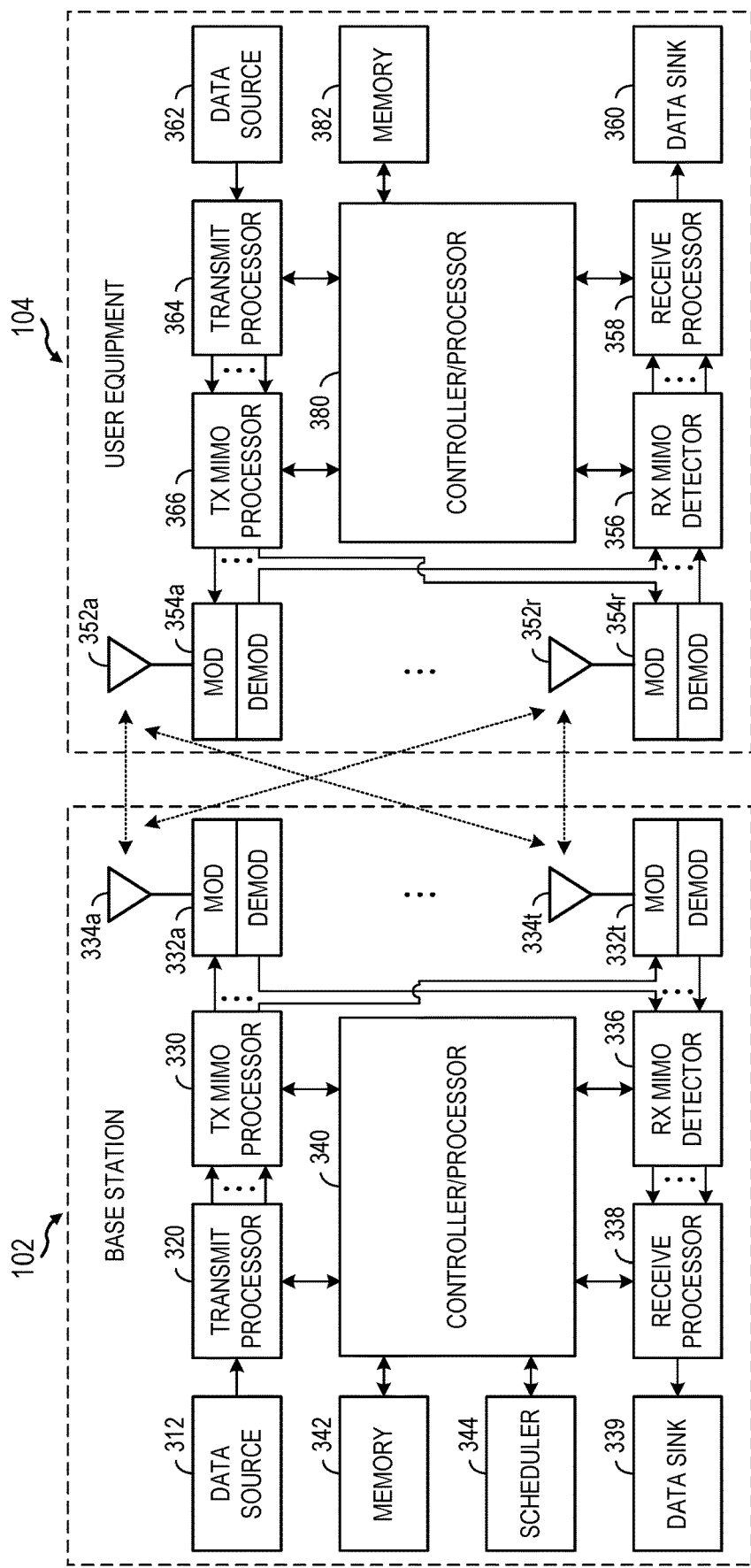
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of sub carriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Signaling Antenna Module
Information for Devices with Adaptable Form
Factor Configurations As noted, certain UEs may have a form factor (e.g., flippable form factor, foldable form factor, rollable form factor, etc.) that allows the UE to operate in different form factor configurations. For a given form factor, the various form factor configurations can include one or more open configurations of the UE in the form factor, a closed configuration of the UE in the form factor, etc. As noted, however, one technical challenge with UEs that can operate in different form factor configurations is that the wireless communication performance of the UE can be negatively impacted when the UE changes form factor configurations (e.g., from an open configuration to a closed configuration, from a closed configuration to an open configuration, from a first open configuration to a second different open configuration, etc.). For example, the wireless communication performance of the UE may be based in part on whether the relative position of antenna module(s) of the UE changes in different form factor configurations.

Figure 5:
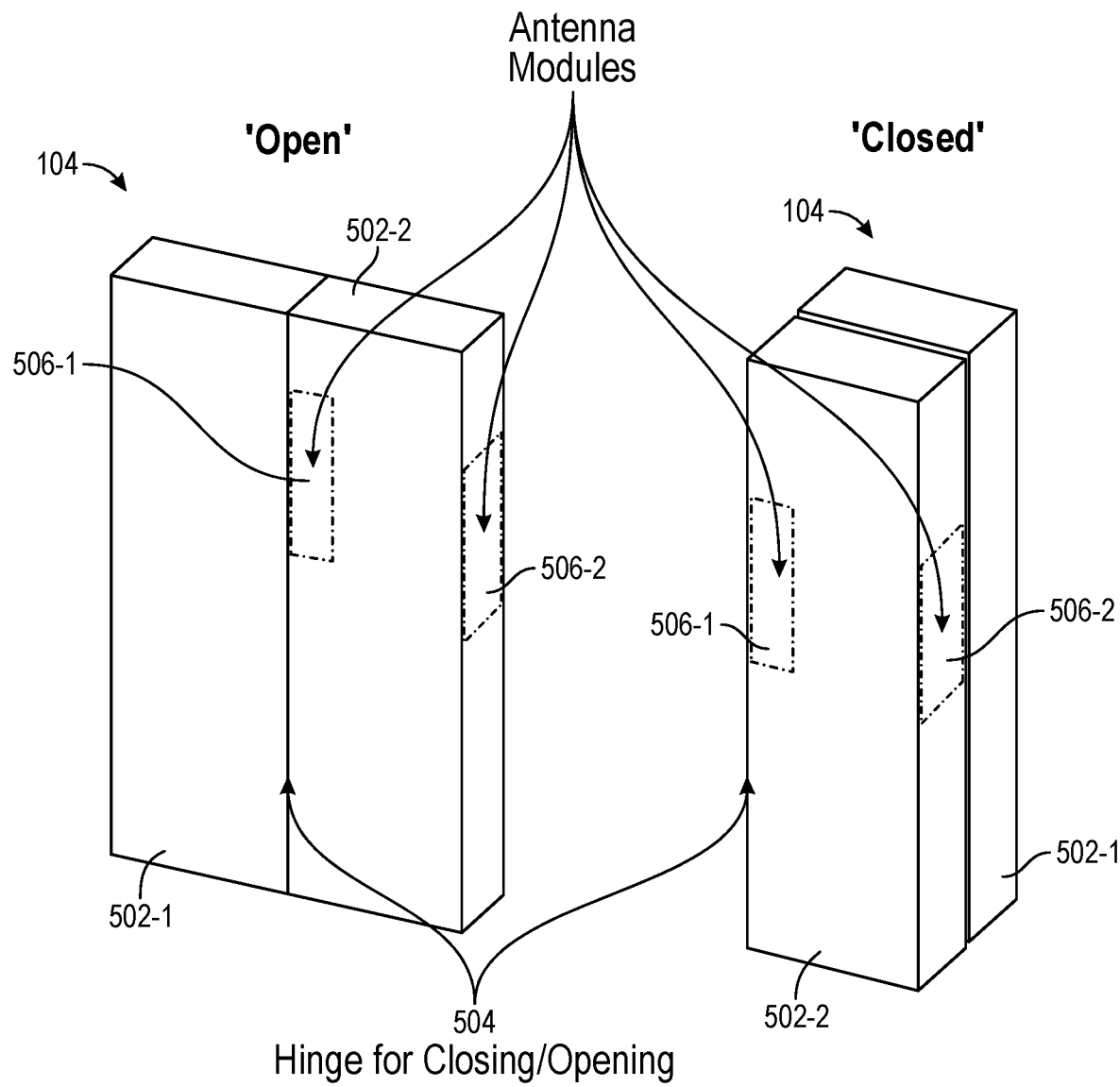
FIG. 5 depicts an example user equipment adapted to operate in different form factor configurations.

In certain cases, the UE may be designed such that the relative position of antenna module(s) of the UE does not change in different form factor configurations. The wireless communication performance of the UE may not be impacted when the relative position of antenna module(s) of the UE does not change in different form factor configurations. A reference example of such a UE having antenna modules that do not change in relative position between different form factor configurations is depicted in FIG. 5. As shown, the UE 104 (e.g., similar to UE 104B depicted in FIG. 1) includes a first portion 502-1 and a second portion 502-2 attached via a mechanical hinge 504. The hinge 504 allows for changing position of the first portion 502-1 relative to the second portion 502-2, and vice versa. For example, when the UE 104 is in the "open" position, a screen of the UE 104 may extend across the planar faces of the first and second portions 502 1-2. When the UE 104 is in the "closed" position, the first position 502-1 is folded onto the second portion 502-2.

As shown in FIG. 5, the UE 104 includes an antenna module 506-1 and an antenna module 506-2 located on the second portion 502-2 of the UE 104. In particular, antenna module 506-1 is located on a back face of the second portion 502-2 and the antenna module 506-2 is located on an (long) edge of the second portion 502-2. Note, however, that the antenna module locations depicted in FIG. 5 are provided as reference examples and that the antenna modules can be deployed in other locations of the UE 104. Here, because the antenna modules 506 1-2 are located on the same portion (e.g., second portion 502-2) of the UE 104, there is no change in the relative position between the antenna modules 506 1-2, when the UE changes between the "open" form factor configuration and the "closed" form factor configuration. The antenna modules 506 1-2 may be located on the same portion (or half) to manage constraints due to cabling/routing flex cabling across the hinge. Note that while FIG. 5 depicts two possible UE form factor configurations (e.g., an "open" form factor configuration and a "closed" form factor configuration), the UE can have greater than two UE form factor configurations. For example, the UE may have one or more partially open form factor configurations.

Figure 6:
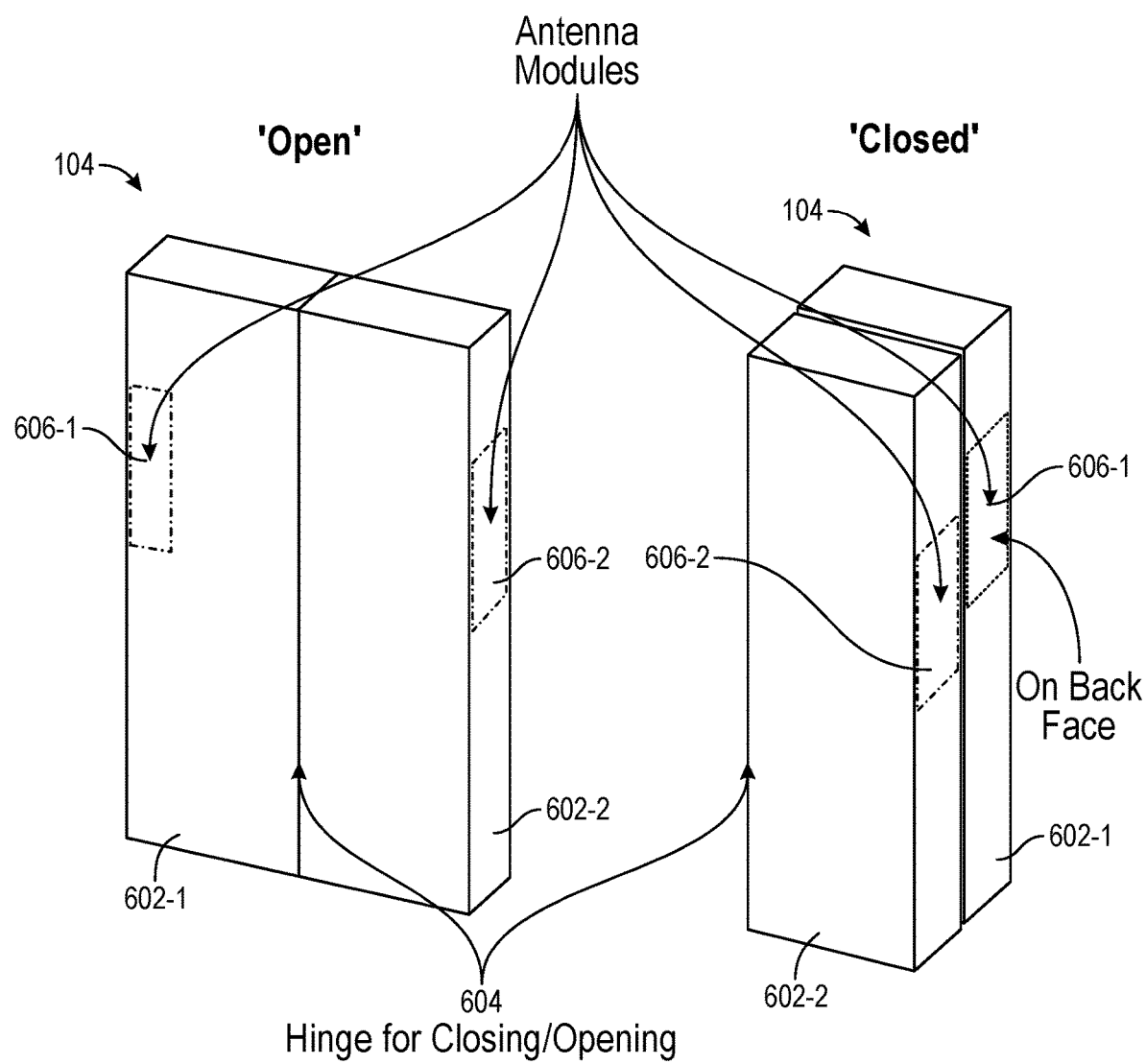
FIG. 6 depicts another example user equipment adapted to operate in different form factor configurations.

In certain cases, the UE may be designed such that the relative position of antenna module(s) of the UE does change in different form factor configurations. The wireless communication performance of the UE may be impacted when the relative position of antenna module(s) of the UE does change in different form factor configurations. A reference example of such a UE having antenna modules that change in relative position between different form factor configurations is depicted in FIG. 6. As shown, the UE 104 (e.g., similar to UE 104B depicted in FIG. 1) includes a first portion 602-1 and a second portion 602-2 attached via a hinge 604. Similar to the hinge 504, the hinge 604 allows for changing position of the first portion 602-1 relative to the second portion 602-2, and vice versa. For example, when the UE 104 is in the "open" position, a screen of the UE 104 may extend across the planar faces of the first and second portions 602 1-2. When the UE 104 is in the "closed" position, the first position 602-1 is folded onto the second portion 602-2.

As shown in FIG. 6, the UE 104 includes an antenna module 606-1 located on the first portion 602-1 and an antenna module 606-2 located on the second portion 602-2 of the UE 104. In particular, the antenna module 606-1 is located on a back face of the first portion 602-1 and the antenna module 606-2 is located on an (long) edge of the second portion 602-2. Note, however, that the antenna module locations depicted in FIG. 6 are provided as reference examples and that the antenna modules can be deployed in other locations of the UE 104.

Here, because the antenna modules 606 1-2 are located on different portions of the UE 104, there is a change in the relative position between the antenna modules 606 1-2, when the UE 104 changes between the "open" form factor configuration and the "closed" form factor configuration. For example, the relative displacement between the antenna modules 606 1-2 may decrease when the UE 104 changes from the "open" form factor configuration to the "closed" form factor configuration, and may increase when the UE 104 changes from the "closed" form factor configuration to the "open" form factor configuration. Note that while FIG. 6 depicts two possible UE form factor configurations (e.g., an "open" form factor configuration and a "closed" form factor configuration), the UE can have greater than two UE form factor configurations. For example, the UE may have one or more partially open form factor configurations.

Figure 7:
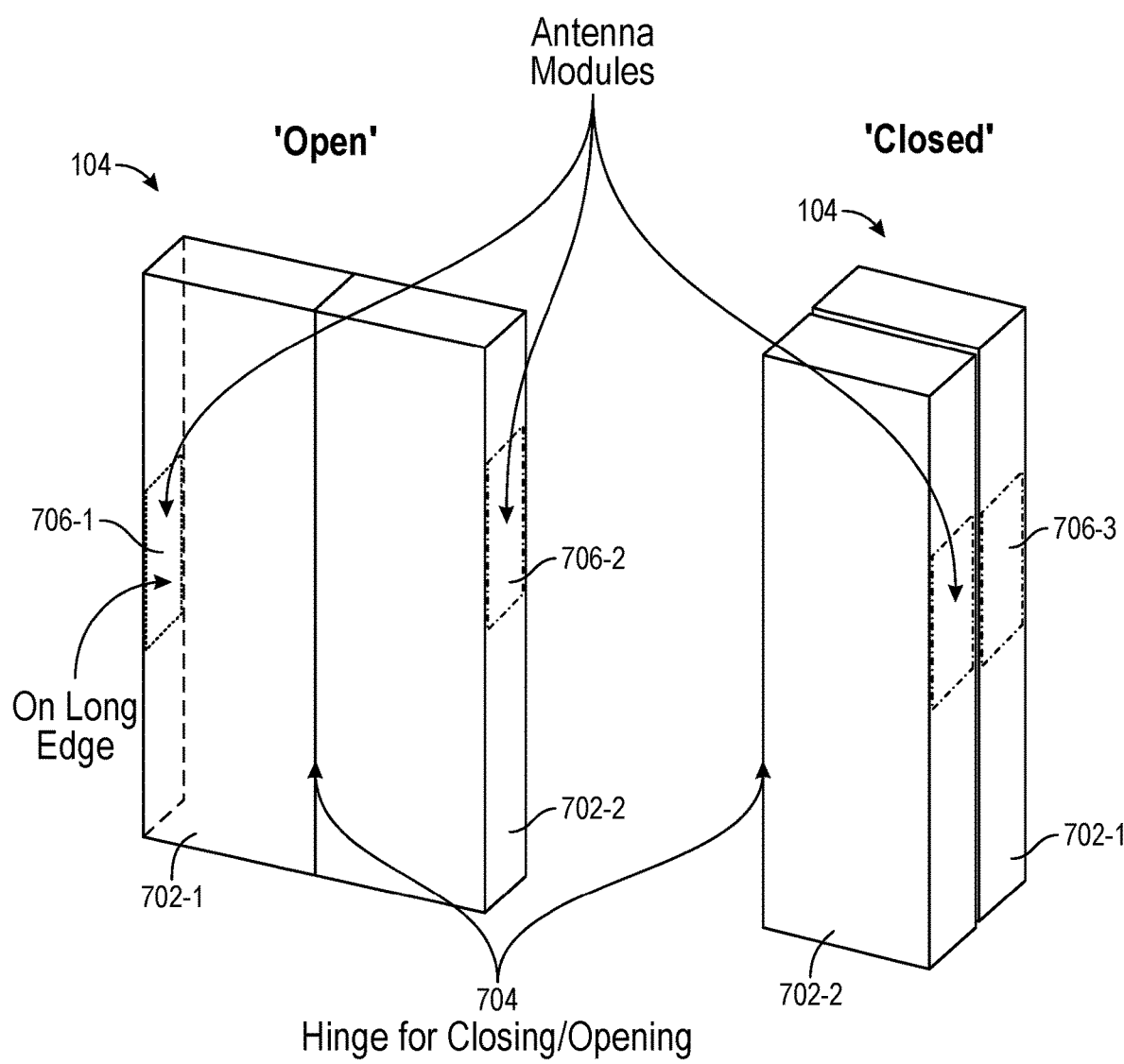
FIG. 7 depicts another example user equipment adapted to operate in different form factor configurations.

Another reference example of a UE having antenna modules that change in relative position between different form factor configurations is depicted in FIG. 7. As shown, the UE 104 (e.g., similar to UE 104B depicted in FIG. 1) includes a first portion 702-1 and a second portion 702-2 attached via a hinge 704. Similar to the hinge 504, the hinge 704 allows for changing position of the first portion 702-1 relative to the second portion 702-2, and vice versa. For example, when the UE 104 is in the "open" position, a screen of the UE 104 may extend across the planar faces of the first and second portions 702 1-2. When the UE 104 is in the "closed" position, the first position 702-1 is folded onto the second portion 702-2.

As shown in FIG. 7, the UE 104 includes an antenna module 706-1 located on the first portion 702-1 and an antenna module 706-2 located on the second portion 702-2 of the UE 104. In particular, the antenna module 706-1 is located on a long edge of the first portion 702-1 and the antenna module 706-2 is located on an (long) edge of the second portion 702-2. Note, however, that the antenna module locations depicted in FIG. 7 are provided as reference examples and that the antenna modules can be deployed in other locations of the UE 104.

Similar to the UE 104 depicted in FIG. 6, in FIG. 7, there is a change in the relative position between the antenna modules 706 1-2, when the UE 104 changes between the "open" form factor configuration and the "closed" form factor configuration. For example, the relative displacement between the antenna modules 706 1-2 may decrease when the UE 104 changes from the "open" form factor configuration to the "closed" form factor configuration, and may increase when the UE 104 changes from the "closed" form factor configuration to the "open" form factor configuration.

Additionally, compared to the UE 104 depicted in FIG. 6, in FIG. 7, the effective number of antenna modules may change (e.g., increase or decrease) when the UE 104 changes between the "open" form factor configuration and the "closed" form factor configuration. For example, the disjoint antenna modules 706 1-2 may collapse (or decrease) into a single effective antenna module (represented as antenna module 706-3) when the UE 104 changes from the "open" form factor configuration to the "closed" form factor configuration. Additionally, the single effective antenna module (e.g., antenna module 706-3) may increase to two disjoint antenna modules 706 1-2 when the UE 104 changes from the "closed" form factor configuration to the "open" form factor configuration.

Note that while FIG. 7 depicts two possible UE form factor configurations (e.g., an "open" form factor configuration and a "closed" form factor configuration), the UE can have greater than two UE form factor configurations. For example, the UE may have one or more partially open form factor configurations.

As noted, in some cases, it may not be possible for a UE, which has the ability to operate in multiple form factor configurations, to determine an updated antenna module configuration over time, based on the particular form factor configuration the UE is operating in at the particular point in time. Consequently, during certain points in time of the UE's operation, the UE may have to use (or rely on) a sub-optimal antenna module configuration when performing wireless communications, including, for example, high data rate or low latency transmissions in mmW systems. Using a sub-optimal antenna module configuration can negatively impact the wireless communication performance of the UE, including, for example, reducing one or more of the speed, data carrying capacity, efficiency, reliability, etc., of the wireless communications, increasing power consumption of the UE, and the like.

To address these aforementioned technical challenges, aspects described herein provide techniques for communicating (or signaling) information associated with at least one antenna module of the UE based on the form factor configuration the UE is operating in at a particular point in time. As noted, the information signaled by the UE can include at least one of: (i) antenna module information (e.g., location/orientation of the antenna module(s)), (ii) beamforming information associated with the antenna module(s), or (iii) power control information associated with the antenna module(s).

The UE may signal the information to a network entity (or node) (e.g., a base station (BS), such as a gNB). The UE may receive an indication of an (updated) reference signal configuration from the network entity and may use the (updated) reference signal configuration for performing wireless communications. By enabling a UE to dynamically update information associated with one or more of the UE's antenna modules over time based on the current form factor configuration the UE is operating in, aspects can significantly improve the performance of wireless communications by the UE, including high data rate transmissions in mmW systems.

Example Operations of Entities in a Communications Network

FIG. 800 depicts a process flow 800 for communications in a network between a network entity 802 and a UE 804. In some aspects, the network entity 802 may be an example of the BS 102 depicted and described with respect to FIGS. 1 and 3 or a disaggregated base station depicted and described with respect to FIG. 2. Similarly, the UE 804 may be an example of a UE 104 (e.g., UE 104A, UE 104B, UE 104C, UE 104D, etc.) depicted and described with respect to FIGS. 1, 3 and 5-7. However, in other aspects, UE 104 may be another type of wireless communications device and BS 102 may be another type of network entity or network node, such as those described herein.

At 810, the network entity 802 signals an indication of a form factor configuration(s) to the UE 804. The form factor configuration(s) may include an indication of a number of form factor configurations supported by the network entity 802. For example, in some cases, the number of form factor configurations that the UE is able to operate in may be significantly large (e.g., greater than a predetermined threshold). In such cases, the network entity 802 may limit (optimized) beam characterization/beamforming capabilities to a smaller set of form factor configurations.

At 820, the UE 804 determines a current form factor configuration that the UE is operating in (e.g., at a particular point in time). In some aspects, the determination of the current form factor configuration may include detecting that the UE has changed from operating in a form factor configuration (e.g., at a first point in time) to operating in the current form factor configuration (e.g., at a second point in time subsequent to the first point in time). In one aspect, the current form factor configuration may be (i) an open configuration of one or more open configurations or (ii) a closed configuration.

In some aspects, the UE 804 may determine the current form factor configuration based on one or more sensors (e.g., accelerometer sensor, proximity sensor, gyroscope sensor, magnetic sensor, light or LIDAR sensor, radar sensor, etc.) of the UE 804. For example, one or more sensors of the UE 804 (and/or at least one UE processor/module configured to process data from the one or more sensors) may provide an indication of the current form factor configuration. The one or more sensors of the UE 804 may also allow for configuring the antenna module(s) of the UE 804. In some aspects, intra-UE signaling between the sensors, processors (or modules), and RF/communication controllers can be performed via an application programming interface(s) (API(s)).

At 830, the UE 804 signals an indication of information associated with the antenna module(s) to the network entity 802. In some aspects, the information includes location information of the antenna module(s) of the UE 804 in the current form factor configuration. For example, the location information of the antenna module(s) of the UE 804 in the current form factor configuration may be different than location information of the antenna module(s) of the UE 804 in another form factor configuration. The network entity may use the location information to determine the impact of one antenna module on another antenna module(s) in beamforming operations (e.g., E-field distortion, whether a condition for a codebook modification is met, whether a condition for a new codebook loading and usage is met, etc.).

In one aspect, the location information can include at least one of (i) a center location of the antenna module(s) or (ii) an orientation of the antenna module(s). In a reference example, the location information can include (x,y,z) coordinates of the antenna module(s) along with an orientation of the antenna module(s) (e.g., linear along Z axis, planar along X-Y plane, etc., in a global coordinate system (GCS) or a local coordinate system (LCS).

In one aspect, the location information can include an indication of a distance between a first antenna module of the UE 804 and a second antenna module of the UE 804. For example, the UE can provide an indication of relative distance measures (in different dimensions) between antenna modules. In some cases, one of the antenna module(s) of the UE 804 may be a reference antenna module. In such cases, the indication of the relative distance measures between antenna modules may be pairwise with respect to the reference antenna module. The reference antenna module can be configured by the UE 804 or the network entity 802.

In some aspects, the information signaled at 830 includes an indication of a beamforming capability of the antenna module(s) of the UE 804 in the current form factor configuration. For example, the beamforming capability of the antenna module(s) of the UE 804 in the current form factor configuration may be different than beamforming capability of the antenna module(s) of the UE 804 in another form factor configuration (e.g., due in part to changes in array dimensions of the antenna module(s) in different form factor configurations). In one aspect, the beamforming capability may be provided in the form of a(n) (updated) beamforming report. The beamforming report may include at least one of (i) array gain information (e.g., a maximum possible array gain), (ii) beamwidth information (e.g., a smallest beamwidth supported by any beam used over the antenna module(s)), (iii) reference signal information (e.g., a number of sounding reference signals (SRSs) supported by the antenna module(s)), etc.

In some aspects, the information signaled in 830 includes power control information associated with the antenna module(s) in the current form factor configuration. As noted with respect to FIG. 7, certain form factor configurations can lead to a reduction in the number of active (or effective) antenna modules of the UE. Currently, however, the UE may not provide updated information on the number of antenna modules, antenna module configurations available at the UE, etc. as the UE changes among different form factor configurations.

In certain systems (e.g., supporting Rel 17 specifications at 3GPP), the UE may be able to communicate the number of antenna modules supported and the number of SRS ports supported in different antenna module configurations. With reference to the example UE depicted in FIG. 7, the UE may communicate that 2 antenna modules and 2 SRS ports are supported in the "open" form factor configuration and that 1 antenna module and 2 SRS ports are supported in the "closed" form factor configuration. However, transmitting information regarding the number of antenna modules supported and the number of SRS ports in different antenna module configurations may not be sufficient for uplink (UL) power control.

Consider the following reference example of a power control loop for PUSCH:

$$P_{PUSCH}(i) = \min\{P_{CMAX}, 10 \log_{10}(M_{PUSCH}(i)) + P_{O\_PUSCH}(j) + \alpha(j) \cdot PL + \Delta_{TF}(i) + f(i)\}[dBm] \quad (1)$$

where $P_{CMAX}$ is the maximum UE power, $10 \log_{10}(M_{PUSCH}(i))$ indicates the number of resource blocks, $P_{O\_PUSCH}(j)$ indicates the target BS receiver power, $\alpha(j) \cdot PL$ indicates the pathloss compensation factor between the UE and BS, $\Delta_{TF}(i)$ indicates the transmission format (e.g., modulation and coding scheme (MCS)), and $f(i)$ is a closed loop power control parameter. For a UE with multiple antenna modules, the UE may be able to operate multiple power control loops (each according to the Equation (1)) over multiple transmission configuration indicator (TCI) states across the multiple antenna modules. Considering again the example UE depicted in FIG. 7, the UE can operate 2 power control loops over 2 independent TCI states across 2 antenna modules. These 2 antenna modules may be the antenna modules 706 1-2 along the long edges of the UE 104 in the "open" form factor configuration. When the UE moves to a "closed" form factor configuration (at a subsequent point in time) (as depicted in FIG. 7), these two power control loops can become redundant. However, the indication of the number of antenna panels supported and the number of SRS ports supported in the "closed" form factor configuration would not be sufficient to convey associated updated power control loops information.

Accordingly, in one aspect, the power control information (signaled in 830) may include an indication of the number of active power control loops to be monitored in the current form factor configuration. Considering the example UE depicted in FIG. 7, the UE may indicate a change from 2 active power control loops to 1 active power control loop to be monitored when the UE changes from "open" to "closed" form factor configuration. Similarly, the UE may indicate a change from 1 active power control loop to 2 active power control loops to be monitored when the UE changes from "closed" to "open" form factor configuration.

In one aspect, the power control information (signaled in 830) may include an indication of an output transmission power configured for the UE in the current form factor configuration. The output transmission power when the UE is in the current form factor configuration may be different than the output transmission power when the UE is in another form factor configuration. For example, considering the UE depicted in FIG. 7, the antenna module (e.g., antenna module 706-3) of the UE in the "closed" form factor configuration may be larger than each of the antenna modules of the UE in the "open" form factor configuration (e.g., 6 dB more in EIRP may be equal to a 3 dB increase in array gain and 3 dB increase in power amplifier (PA) power). In one aspect, the output transmission power may include a maximum output transmission power configured for the UE (e.g., $P_{CMAX}$ in Equation (3)).

In one aspect, the power control information (signaled in 830) may include an indication of an updated beamforming capability for the UE in the current form factor configuration. For example, the UE may provide the updated beamforming capability in the form of an updated beamforming report (upon a change in the UE's form factor configuration). The updated beamforming report may include at least one of: (i) a number of supported SRS in panels, (ii) a maximum array gain, or (iii) a beamwidth of a narrowest beam. The UE may also dynamically update the beamforming report over time (with or without a change in the UE's form factor configuration).

Example Operations of a User Equipment

Figure 9:
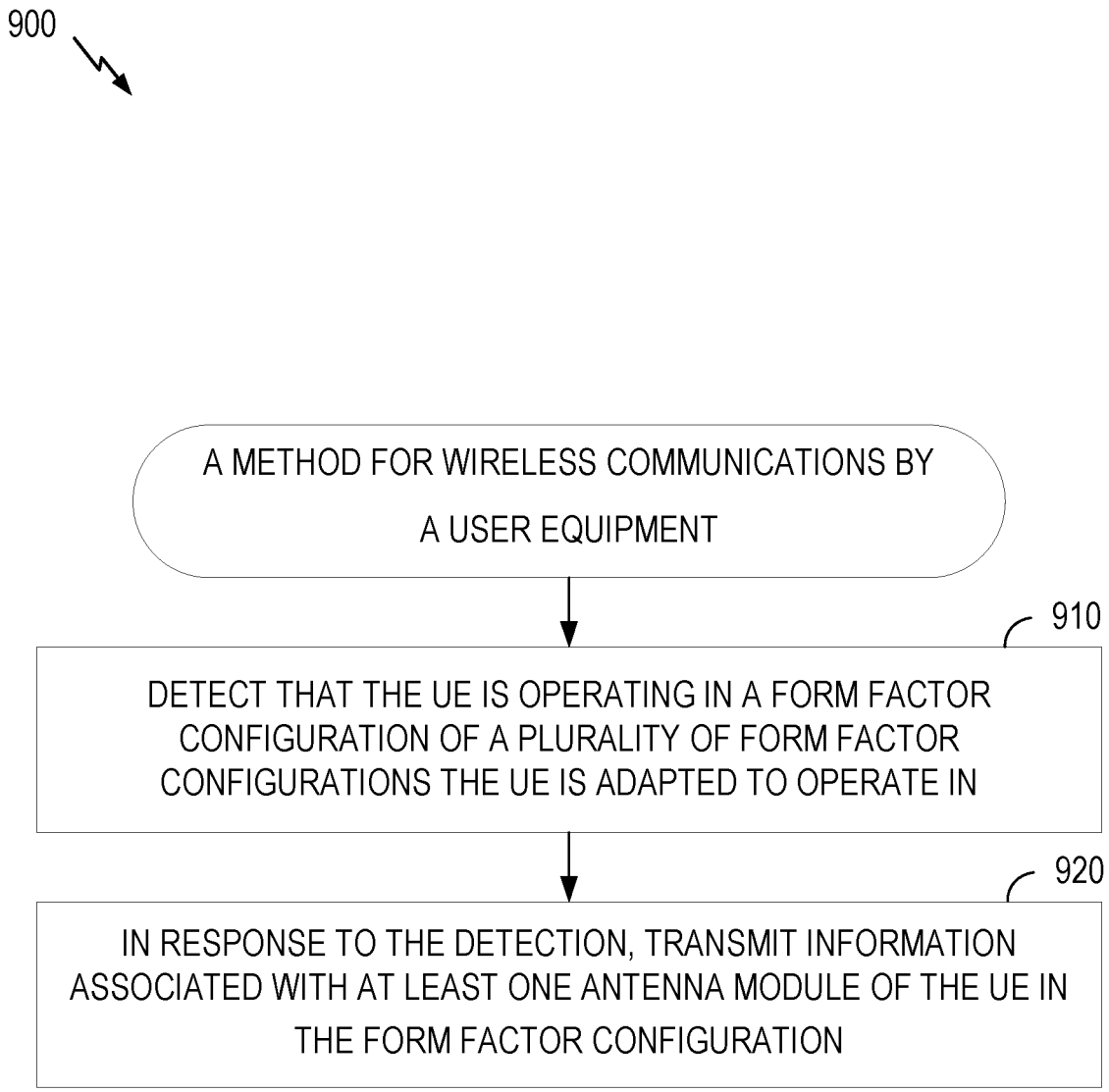
FIG. 9 depicts a method for wireless communications.

FIG. 9 shows a method 900 for wireless communications by a UE, such as UE 104 of FIGS. 1 and 3 (e.g., UE 104A, UE 104B, UE 104C, UE 104D, etc.).

Figure 8:
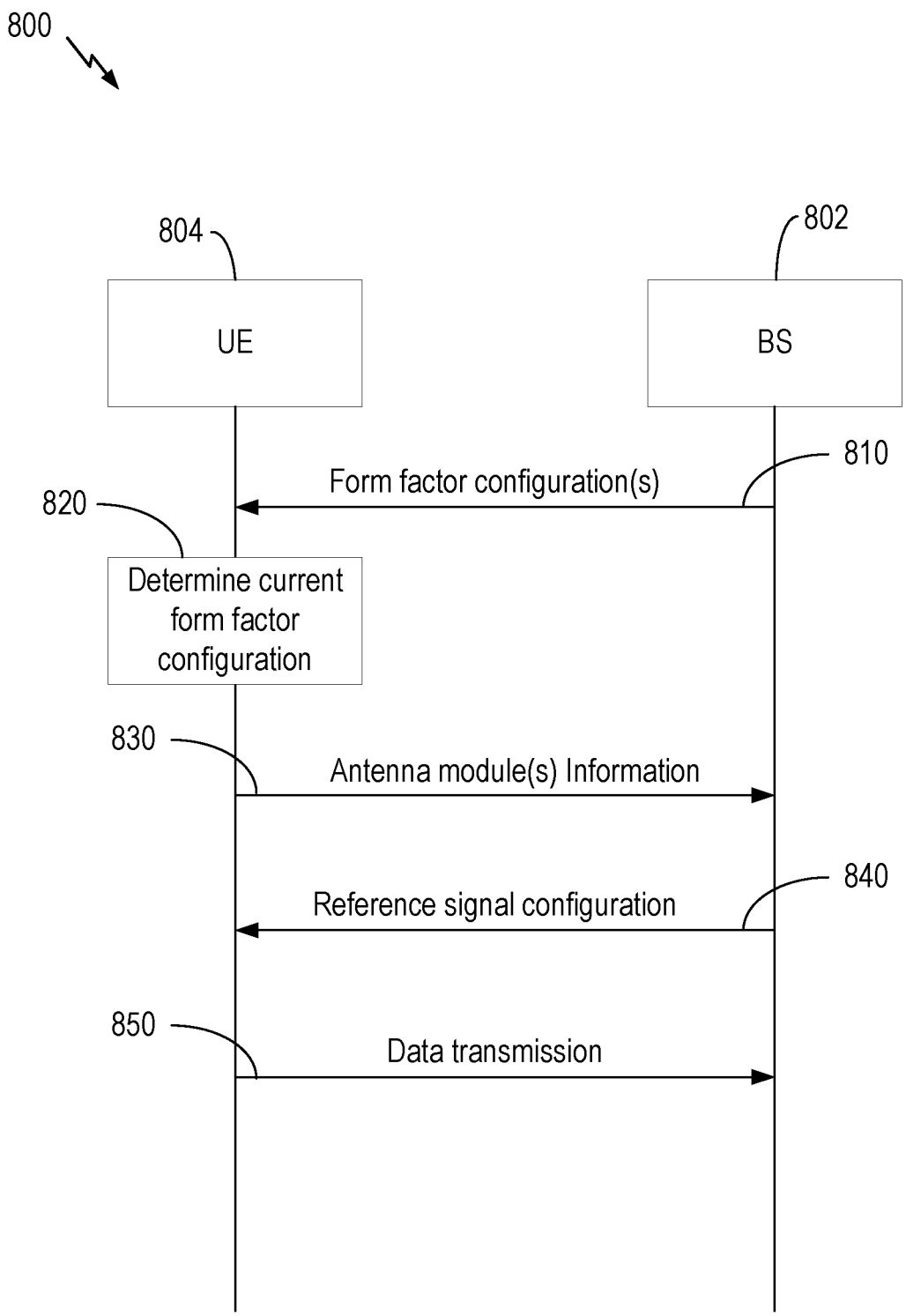
FIG. 8 depicts a process flow for communications in a network between a UE and a base station.

Method 900 begins at 910, where the UE detects that the UE is operating in a (first) form factor configuration of a plurality of form factor configurations the UE is adapted to operate in (e.g., 820 of process flow 800 depicted in FIG. 8). In one aspect, detecting that the UE is operating in the (first) form factor configuration includes detecting a change from the UE operating in another (second) form factor configuration of the plurality of form factor configurations to operating in the (first) form factor configuration. In another aspect, detecting that the UE is operating in the (first) form factor configuration includes receiving information indicating that the UE is operating in the first form factor configuration from at least one sensor of the UE.

Method 900 then proceeds to step 920, where the UE, in response to the detection, transmits information associated with at least one antenna module of the UE in the form factor configuration (e.g., 830 of process flow 800 depicted in FIG. 8).

In one aspect, method 900 further includes the UE receiving a configuration indicating a number of the plurality of form factor configurations (e.g., 810 of process flow 800 depicted in FIG. 8).

In one aspect, the information in step 920 includes a number of active power control loops being monitored by the UE in the (first) form factor configuration.

In one aspect, the number of active power control loops being monitored by the UE in the (first) form factor configuration may be less than a number of active power control loops being monitored by the UE in a (second) form factor configuration of the plurality of form factor configurations. For example, the number of active power control loops being monitored by the UE in the (first) form factor configuration may be less than a number of the at least one antenna module of the UE. In another example, the number of active power control loops being monitored by the UE in the (second) form factor configuration may be equal to the number of the at least one antenna module of the UE.

In one aspect, the number of active power control loops being monitored by the UE in the (first) form factor configuration may be greater than a number of active power control loops being monitored by the UE in a (second) form factor configuration of the plurality of form factor configurations.

In one aspect, the information in step 920 may include an indication of a maximum output transmission power configured for the UE.

In one aspect, the information in step 920 may include an indication of a beamforming capability of the at least one antenna module of the UE in the (first) form configuration. The indication of the beamforming capability may include at least one of: (i) a maximum possible array gain, a number of SRS signals supported by the at least one antenna module, or a smallest beamwidth supported by any beam used over the at least one antenna module.

In one aspect, the information in step 920 includes a location of the at least one antenna module of the UE in the (first) or (second) form factor configuration.

In one aspect, the location of the at least one antenna module may include at least one of (i) a center location of the at least one antenna module or (ii) an orientation of the at least one antenna module.

In one aspect, the location of the at least one antenna module of the UE in the (first) form factor configuration is different than a location of the at least one antenna module of the UE in a (second) form factor configuration of the plurality of form factor configurations.

In one aspect, the at least one antenna module includes a plurality of antenna modules and the location of the at least one antenna module includes an indication of a distance between (i) a first antenna module of the plurality of antenna modules and (ii) a second antenna module of the plurality of antenna modules.

Figure 12:
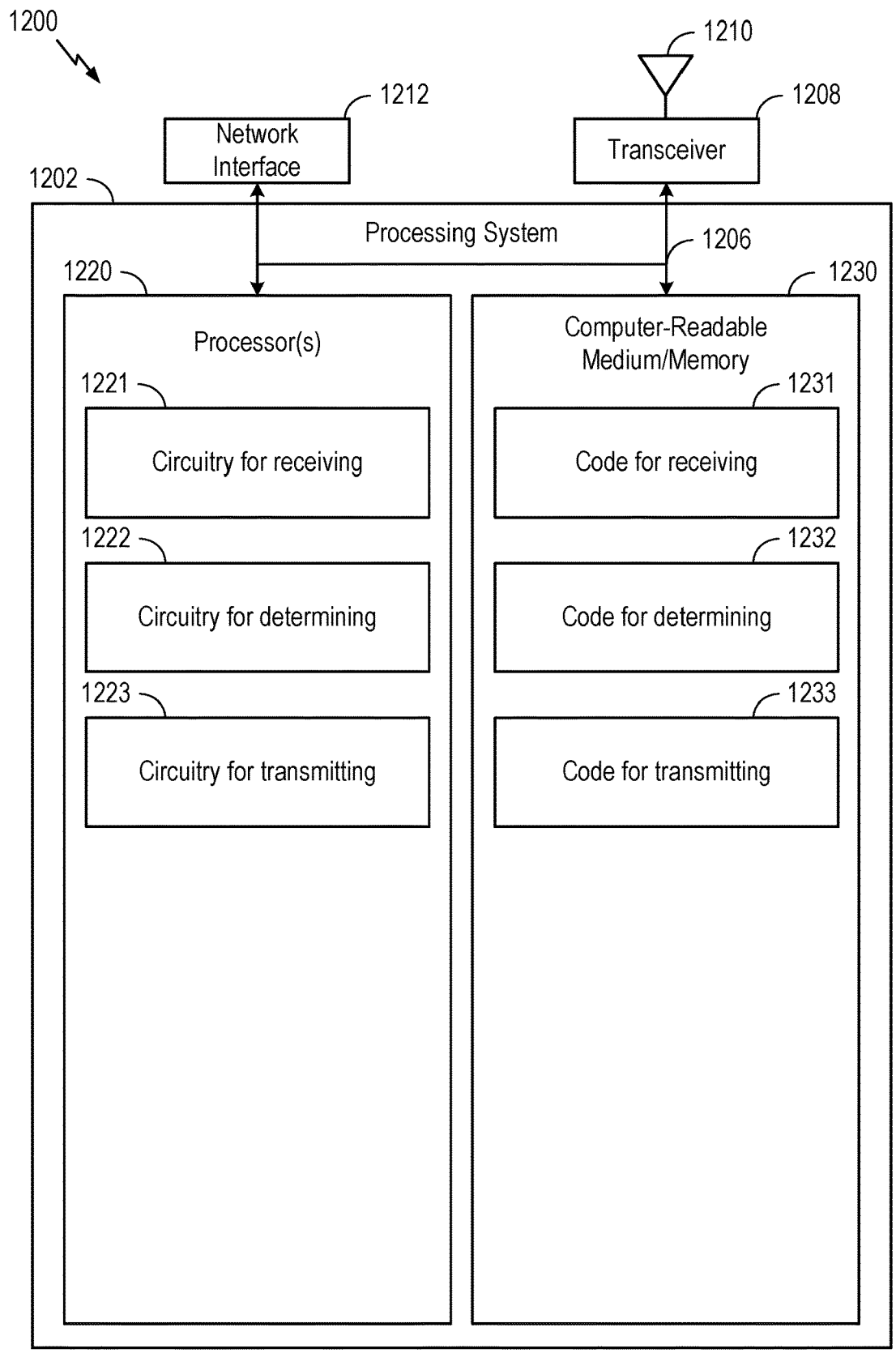
FIG. 12 depicts aspects of an example communications device.

In one aspect, method 900, or any aspect related to it, may be performed by an apparatus, such as communications device 1200 of FIG. 12, which includes various components operable, configured, or adapted to perform the method 900. Communications device 1200 is described below in further detail.

Note that FIG. 9 is just one example of a method, and other methods including fewer, additional, or alternative steps are possible consistent with this disclosure.

Example Operations of a Network Entity

Figure 10:
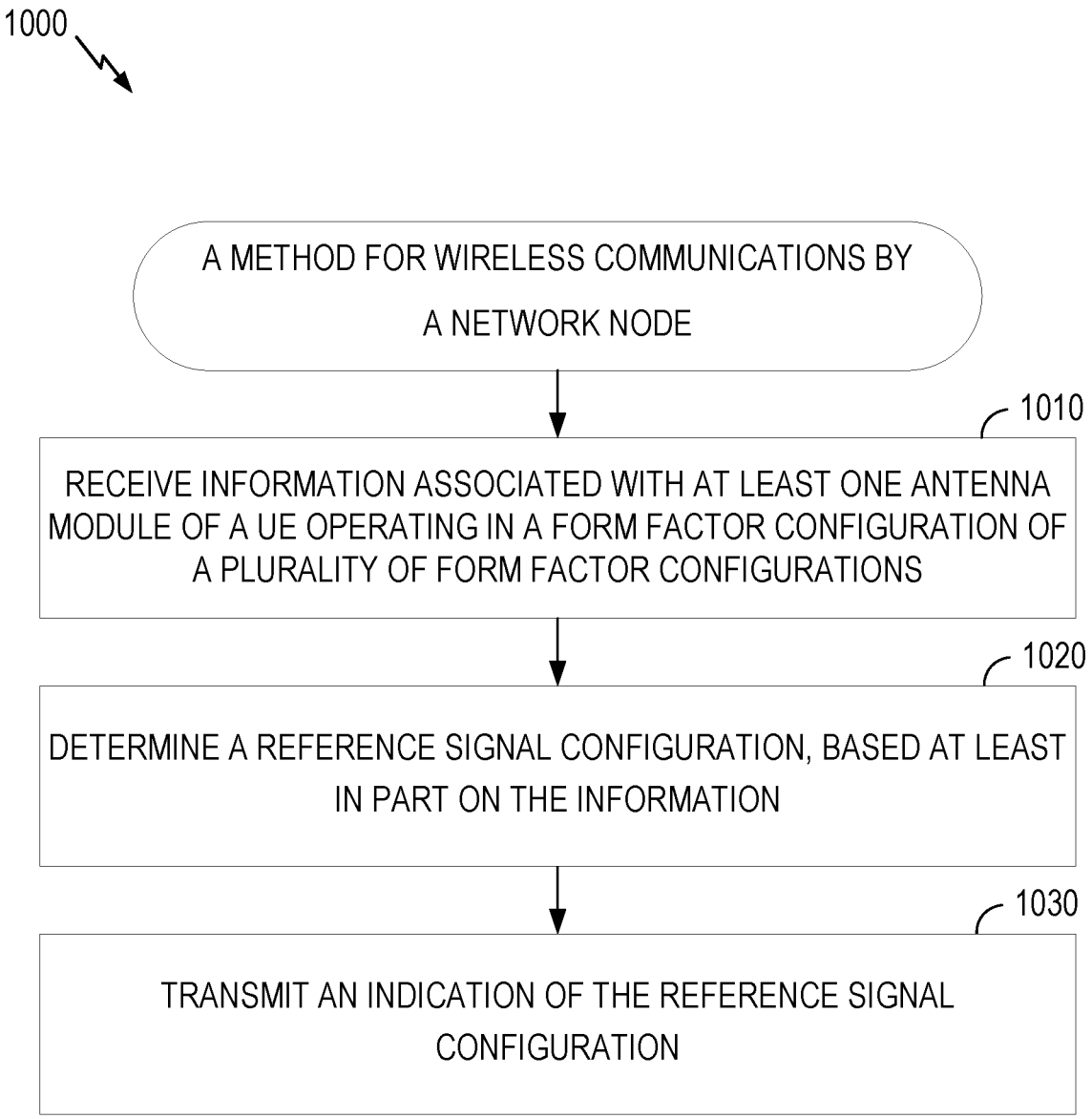
FIG. 10 depicts a method for wireless communications.

FIG. 10 shows a method 1000 for wireless communications by a network entity, such as BS 102 of FIGS. 1 and 3, or a disaggregated base station as discussed with respect to FIG. 2.

Method 1000 begins at 1010, where the network entity receives information associated with at least one antenna module of a UE operating in a first form factor configuration of a plurality of form factor configurations (e.g., 830 of process flow 800 depicted in FIG. 8).

Method 1000 then proceeds to step 1020, where the network entity determines a reference signal configuration, based at least in part on the information. At step 1030, the network entity transmits an indication of the reference signal configuration (e.g., 840 of process flow 800 depicted in FIG. 8).

In one aspect, method 1000 further includes the network entity configuring a number of the plurality of form factor configurations for the UE and transmitting an indication of the number of the plurality of form factor configurations to the UE.

Figure 11:
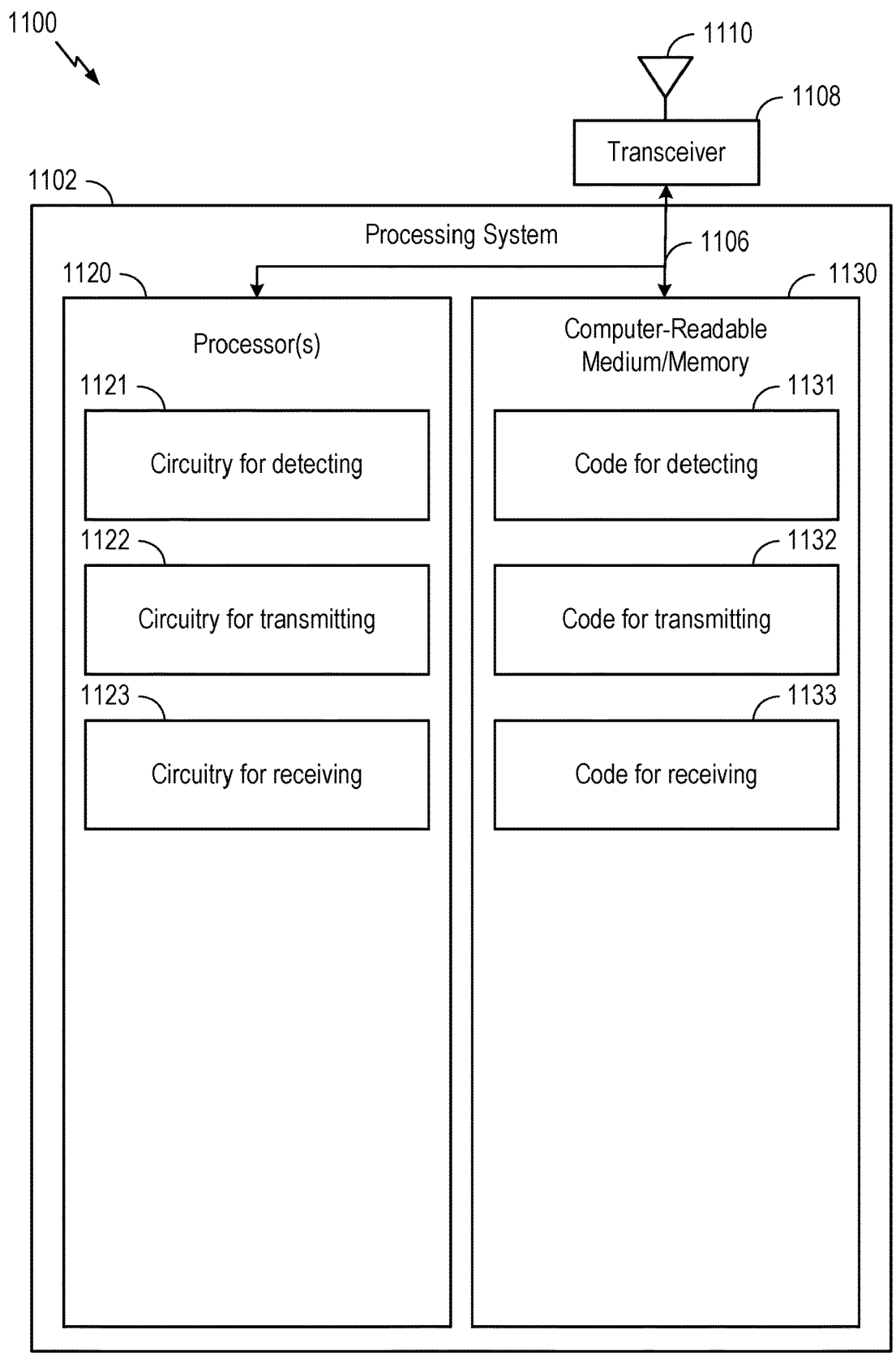
FIG. 11 depicts aspects of an example communications device.

In one aspect, method 1000, or any aspect related to it, may be performed by an apparatus, such as communications device 1100 of FIG. 11, which includes various components operable, configured, or adapted to perform the method 1000. Communications device 1100 is described below in further detail.

In one aspect, the information in step 1010 includes a number of active power control loops being monitored by the UE in the (first) form factor configuration.

In one aspect, the number of active power control loops being monitored by the UE in the (first) form factor configuration may be less than a number of active power control loops being monitored by the UE in a (second) form factor configuration of the plurality of form factor configurations. For example, the number of active power control loops being monitored by the UE in the (first) form factor configuration may be less than a number of the at least one antenna module of the UE. In another example, the number of active power control loops being monitored by the UE in the (second) form factor configuration may be equal to the number of the at least one antenna module of the UE.

In one aspect, the number of active power control loops being monitored by the UE in the (first) form factor configuration may be greater than a number of active power control loops being monitored by the UE in a (second) form factor configuration of the plurality of form factor configurations.

In one aspect, the information in step 1010 may include an indication of a maximum output transmission power configured for the UE.

In one aspect, the information in step 1010 may include an indication of a beamforming capability of the at least one antenna module of the UE in the (first) form factor configuration. The indication of the beamforming capability may include at least one of: (i) a maximum possible array gain, a number of SRS signals supported by the at least one antenna module, or a smallest beamwidth supported by any beam used over the at least one antenna module.

In one aspect, the information in step 1010 includes a location of the at least one antenna module of the UE in the (first) or (second) form factor configuration.

In one aspect, the location of the at least one antenna module may include at least one of (i) a center location of the at least one antenna module or (ii) an orientation of the at least one antenna module.

In one aspect, the location of the at least one antenna module of the UE in the (first) form factor configuration is different than a location of the at least one antenna module of the UE in a (second) form factor configuration of the plurality of form factor configurations.

In one aspect, the at least one antenna module includes a plurality of antenna modules and the location of the at least one antenna module includes an indication of a distance between (i) a first antenna module of the plurality of antenna modules and (ii) a second antenna module of the plurality of antenna modules.

Note that FIG. 10 is just one example of a method, and other methods including fewer, additional, or alternative steps are possible consistent with this disclosure.

Example Communications Devices

FIG. 11 depicts aspects of an example communications device 1100. In some aspects, communications device 1100 is a user equipment, such as UE 104 described above with respect to FIGS. 1 and 3.

The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes one or more processors 1120. In various aspects, the one or more processors 1120 may be representative of one or more of receive processor 358, transmit processor 364, TX MIMO processor 366, and/or controller/processor 380, as described with respect to FIG. 3. The one or more processors 1120 are coupled to a computer-readable medium/memory 1130 via a bus 1106. In certain aspects, the computer-readable medium/memory 1130 is configured to store instructions (e.g., computer-executable code) that when executed by the one or more processors 1120, cause the one or more processors 1120 to perform the method 900 described with respect to FIG. 9, or any aspect related to it. Note that reference to a processor performing a function of communications device 1100 may include one or more processors performing that function of communications device 1100.

In the depicted example, computer-readable medium/memory 1130 stores code 1131 (e.g., executable instructions) for detecting that the UE is operating in a form factor configuration, code 1132 for transmitting information associated with at least one antenna module of the UE in the form factor configuration, and code 1133 for receiving information and/or a configuration. Processing of the code 1131-1133 may cause the communications device 1100 to perform the method 900 described with respect to FIG. 9, or any aspect related to it.

The one or more processors 1120 include circuitry configured to implement (e.g., execute) the code stored in the computer-readable medium/memory 1130, including circuitry 1121 for detecting that the UE is operating in a form factor configuration, circuitry 1122 for transmitting information associated with at least one antenna module of the UE in the form factor configuration, and circuitry 1123 for receiving information and/or a configuration. Processing with circuitry 1121-1123 may cause the communications device 1100 to perform the method 900 described with respect to FIG. 9, or any aspect related to it.

Various components of the communications device 1100 may provide means for performing the method 900 described with respect to FIG. 9, or any aspect related to it. For example, means for transmitting, sending or outputting for transmission may include the transceivers 354 and/or antenna(s) 352 of the UE 104 illustrated in FIG. 3 and/or transceiver 1108 and antenna 1110 of the communications device 1100 in FIG. 11. Means for receiving or obtaining may include the transceivers 354 and/or antenna(s) 352 of the UE 104 illustrated in FIG. 3 and/or transceiver 1108 and antenna 1110 of the communications device 1100 in FIG. 11.

FIG. 12 depicts aspects of an example communications device. In some aspects, communications device 1200 is a network entity, such as BS 102 of FIGS. 1 and 3, or a disaggregated base station as discussed with respect to FIG. 2.

The communications device 1200 includes a processing system 1202 coupled to a transceiver 1208 (e.g., a transmitter and/or a receiver) and/or a network interface 1212. The transceiver 1208 is configured to transmit and receive signals for the communications device 1200 via an antenna 1210, such as the various signals as described herein. The network interface 1212 is configured to obtain and send signals for the communications device 1200 via communications link(s), such as a backhaul link, midhaul link, and/or fronthaul link as described herein, such as with respect to FIG. 2. The processing system 1202 may be configured to perform processing functions for the communications device 1200, including processing signals received and/or to be transmitted by the communications device 1200.

The processing system 1202 includes one or more processors 1220. In various aspects, one or more processors 1220 may be representative of one or more of receive processor 338, transmit processor 320, TX MIMO processor 330, and/or controller/processor 340, as described with respect to FIG. 3. The one or more processors 1220 are coupled to a computer-readable medium/memory 1230 via a bus 1206. In certain aspects, the computer-readable medium/memory 1230 is configured to store instructions (e.g., computer-executable code) that when executed by the one or more processors 1220, cause the one or more processors 1220 to perform the method 1000 described with respect to FIG. 10, or any aspect related to it. Note that reference to a processor of communications device 1200 performing a function may include one or more processors of communications device 1200 performing that function.

In the depicted example, the computer-readable medium/memory 1230 stores code 1231 (e.g., executable instructions) for receiving information associated with at least one antenna module of a UE operating in a form factor configuration, code 1232 for determining a reference signal configuration, based at least in part on the information, and code 1233 for transmitting an indication of the reference signal configuration. Processing of the code 1231-1233 may cause the communications device 1200 to perform the method 1000 described with respect to FIG. 10, or any aspect related to it.

The one or more processors 1220 include circuitry configured to implement (e.g., execute) the code stored in the computer-readable medium/memory 1230, including circuitry 1221 for receiving information associated with at least one antenna module of a UE operating in a form factor configuration, circuitry 1222 for determining a reference signal configuration, based at least in part on the information, and circuitry 1223 for transmitting an indication of the reference signal configuration. Processing with circuitry 1221-1223 may cause the communications device 1200 to perform the method 1000 as described with respect to FIG. 10, or any aspect related to it.

Various components of the communications device 1200 may provide means for performing the method 1000 as described with respect to FIG. 10, or any aspect related to it. Means for transmitting, sending or outputting for transmission may include the transceivers 332 and/or antenna(s) 334 of the BS 102 illustrated in FIG. 3 and/or transceiver 1208 and antenna 1210 of the communications device 1200 in FIG. 12. Means for receiving or obtaining may include the transceivers 332 and/or antenna(s) 334 of the BS 102 illustrated in FIG. 3 and/or transceiver 1208 and antenna 1210 of the communications device 1200 in FIG. 12.

Example Clauses

Implementation examples are described in the following numbered clauses:

Clause 1: A method for wireless communications by a user equipment (UE), comprising: detecting that the UE is operating in a first form factor configuration of a plurality of form factor configurations the UE is adapted to operate in; and in response to the detection, transmitting information associated with at least one antenna module of the UE in the first form factor configuration.

Clause 2: The method of clause 1, wherein the information comprises a number of active power control loops being monitored by the UE in the first form factor configuration.

Clause 3: The method of clause 2, wherein the number of active power control loops being monitored by the UE in the first form factor configuration is less than a number of active power control loops being monitored by the UE in a second form factor configuration of the plurality of form factor configurations.

Clause 4: The method of clause 3, wherein the number of active power control loops being monitored by the UE in the first form factor configuration is less than a number of the at least one antenna module of the UE.

Clause 5: The method of clause 3, wherein the number of active power control loops being monitored by the UE in the second form factor configuration is equal to the number of the at least one antenna module of the UE.

Clause 6: The method of clause 2, wherein the number of active power control loops being monitored by the UE in the first form factor configuration is greater than a number of active power control loops being monitored by the UE in a second form factor configuration of the plurality of form factor configurations.

Clause 7: The method of clause 1, wherein the information comprises an indication of a maximum output transmission power configured for the UE.

Clause 8: The method of clause 1, wherein the information comprises an indication of a beamforming capability of the at least one antenna module of the UE in the first form factor configuration.

Clause 9: The method of clause 8, wherein the indication of the beamforming capability comprises at least one of a maximum possible array gain, a number of sounding reference signals (SRSs) supported by the at least one antenna module, or a smallest beamwidth supported by any beam used over the at least one antenna module.

Clause 10: The method of clause 1, wherein detecting that the UE is operating in the first form factor configuration comprises receiving information indicating that the UE is operating in the first form factor configuration from at least one sensor of the UE.

Clause 11: The method of clause 1, further comprising receiving a configuration indicating a number of the plurality of form factor configurations.

Clause 12: The method of clause 1, wherein detecting that the UE is operating in the first form factor configuration comprises detecting a change from the UE operating in a second form factor configuration of the plurality of form factor configurations to operating in the first form factor configuration.

Clause 13: The method of clause 1, wherein the information comprises a location of the at least one antenna module of the UE in the first or second form factor configuration.

Clause 14: The method of clause 13, wherein the location of the at least one antenna module comprises at least one of (i) a center location of the at least one antenna module or (ii) an orientation of the at least one antenna module.

Clause 15: The method of clause 13, wherein the location of the at least one antenna module of the UE in the first form factor configuration is different than a location of the at least one antenna module of the UE in a second form factor configuration of the plurality of form factor configurations.

Clause 16: The method of clause 13, wherein: the at least one antenna module comprises a plurality of antenna modules; and the location of the at least one antenna module comprises an indication of a distance between (i) a first antenna module of the plurality of antenna modules and (ii) a second antenna module of the plurality of antenna modules.

Clause 17: A method for wireless communications by a network node, comprising: receiving information associated with at least one antenna module of a user equipment (UE) operating in a first form factor configuration of a plurality of form factor configurations; determining a reference signal configuration, based at least in part on the information; and transmitting an indication of the reference signal configuration.

Clause 18: The method of clause 17, further comprising: configuring a number of the plurality of form factor configurations for the UE; and transmitting an indication of the number of the plurality of form factor configurations to the UE.

Clause 19: An apparatus for wireless communications, the apparatus comprising a memory comprising executable instructions; and a processor configured to execute the executable instructions and cause the apparatus to perform a method in accordance with any one of clauses 1-16.

Clause 20: An apparatus for wireless communications, comprising means for performing a method in accordance with any one of clauses 1-16.

Clause 21: A non-transitory computer-readable medium comprising executable instructions that, when executed by a processor of an apparatus, cause the apparatus to perform a method in accordance with any one of clauses 1-16.

Clause 22: A computer program product embodied on a computer-readable storage medium comprising code for performing a method in accordance with any one of clauses 1-16.

Clause 23: An apparatus for wireless communications, the apparatus comprising a memory comprising executable instructions; and a processor configured to execute the executable instructions and cause the apparatus to perform a method in accordance with any one of clauses 17-18.

Clause 24: An apparatus for wireless communications, comprising means for performing a method in accordance with any one of clauses 17-18.

Clause 25: A non-transitory computer-readable medium comprising executable instructions that, when executed by a processor of an apparatus, cause the apparatus to perform a method in accordance with any one of clauses 17-18.

Clause 26: A computer program product embodied on a computer-readable storage medium comprising code for performing a method in accordance with any one of clauses 17-18.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one" of a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), comprising:
   detecting that the UE is operating in a first form factor configuration of a plurality of form factor configurations the UE is adapted to operate in; and in response to the detection, transmitting information associated with at least one antenna module of the UE in the first form factor configuration.

2. The method of claim 1, wherein the information comprises a number of active power control loops being monitored by the UE in the first form factor configuration.

3. The method of claim 2, wherein the number of active power control loops being monitored by the UE in the first form factor configuration is less than a number of active power control loops being monitored by the UE in a second form factor configuration of the plurality of form factor configurations.

4. The method of claim 3, wherein the number of active power control loops being monitored by the UE in the first form factor configuration is less than a number of the at least one antenna module of the UE.

5. The method of claim 3, wherein the number of active power control loops being monitored by the UE in the second form factor configuration is equal to the number of the at least one antenna module of the UE.

6. The method of claim 2, wherein the number of active power control loops being monitored by the UE in the first form factor configuration is greater than a number of active power control loops being monitored by the UE in a second form factor configuration of the plurality of form factor configurations.

7. The method of claim 1, wherein the information comprises an indication of a maximum output transmission power configured for the UE.

8. The method of claim 1, wherein the information comprises an indication of a beamforming capability of the at least one antenna module of the UE in the first form factor configuration.

9. The method of claim 8, wherein the indication of the beamforming capability comprises at least one of a maximum possible array gain, a number of sounding reference signals (SRSs) supported by the at least one antenna module, or a smallest beamwidth supported by any beam used over the at least one antenna module.

10. The method of claim 1, wherein detecting that the UE is operating in the first form factor configuration comprises receiving information indicating that the UE is operating in the first form factor configuration from at least one sensor of the UE.

11. The method of claim 1, further comprising receiving a configuration indicating a number of the plurality of form factor configurations.

12. The method of claim 1, wherein detecting that the UE is operating in the first form factor configuration comprises detecting a change from the UE operating in a second form factor configuration of the plurality of form factor configurations to operating in the first form factor configuration.

13. The method of claim 1, wherein the information comprises a location of the at least one antenna module of the UE in the first or second form factor configuration.

14. The method of claim 13, wherein the location of the at least one antenna module comprises at least one of (i) a center location of the at least one antenna module or (ii) an orientation of the at least one antenna module.

15. The method of claim 13, wherein the location of the at least one antenna module of the UE in the first form factor configuration is different than a location of the at least one antenna module of the UE in a second form factor configuration of the plurality of form factor configurations.

16. The method of claim 13, wherein:
the at least one antenna module comprises a plurality of antenna modules; and
the location of the at least one antenna module comprises an indication of a distance between (i) a first antenna module of the plurality of antenna modules and (ii) a second antenna module of the plurality of antenna modules.

17. An apparatus for wireless communications, comprising:
at least one processor configured to detect that the apparatus is operating in a first form factor configuration of a plurality of form factor configurations the apparatus is adapted to operate in;
a transmitter configured to transmit information associated with at least one antenna module of the apparatus in the first form factor configuration, in response to the detection; and
a memory coupled to the at least one processor.

18. The apparatus of claim 17, wherein the information comprises a number of active power control loops being monitored by the apparatus in the first form factor configuration.

19. The apparatus of claim 18, wherein the number of active power control loops being monitored by the apparatus in the first form factor configuration is less than a number of active power control loops being monitored by the apparatus in a second form factor configuration of the plurality of form factor configurations.

20. The apparatus of claim 18, wherein the number of active power control loops being monitored by the apparatus in the first form factor configuration is greater than a number of active power control loops being monitored by the apparatus in a second form factor configuration of the plurality of form factor configurations.

21. The apparatus of claim 17, wherein the information comprises an indication of a maximum output transmission power configured for the apparatus.

22. The apparatus of claim 17, wherein the information comprises an indication of a beamforming capability of the at least one antenna module of the apparatus in the first form factor configuration.

23. The apparatus of claim 22, wherein the indication of the beamforming capability comprises at least one of a maximum possible array gain, a number of sounding reference signals (SRSs) supported by the at least one antenna module, or a smallest beamwidth supported by any beam used over the at least one antenna module.

24. The apparatus of claim 17, wherein detecting that the apparatus is operating in the first form factor configuration comprises receiving information indicating that the apparatus is operating in the first form factor configuration from at least one sensor of the apparatus.

25. The apparatus of claim 17, wherein detecting that the apparatus is operating in the first form factor configuration comprises detecting a change from the apparatus operating in a second form factor configuration of the plurality of form factor configurations to operating in the first form factor configuration.

26. The apparatus of claim 17, wherein the information comprises a location of the at least one antenna module of the apparatus in the first or second form factor configuration.

27. The apparatus of claim 26, wherein the location of the at least one antenna module comprises at least one of (i) a center location of the at least one antenna module or (ii) an orientation of the at least one antenna module.

28. A method for wireless communications by a network node, comprising:
- receiving information associated with at least one antenna module of a user equipment (UE) operating in a first form factor configuration of a plurality of form factor configurations;
- determining a reference signal configuration, based at least in part on the information; and
- transmitting an indication of the reference signal configuration.

29. The method of claim 28, further comprising:
- configuring a number of the plurality of form factor configurations for the UE; and
- transmitting an indication of the number of the plurality of form factor configurations to the UE.

30. An apparatus for wireless communications, comprising:
- a receiver configured to receive information associated with at least one antenna module of a user equipment (UE) operating in a first form factor configuration of a plurality of form factor configurations;
- at least one processor configured to determine a reference signal configuration, based at least in part on the information;
- a transmitter configured to transmit an indication of the reference signal configuration; and
- a memory coupled to the at least one processor.

* * * * *